United States Patent [19]

Templeton et al.

[11] Patent Number: 4,786,353
[45] Date of Patent: Nov. 22, 1988

[54] LAMINATING METHOD AND APPARATUS WITH EXTENSIBLE WEB WIDTH CONTROL

[75] Inventors: Darrell L. Templeton; Eddy Cothren, both of Lawrenceburg, Tenn.; Peter Vischer, Golden, Colo.

[73] Assignee: Adolph Coors Company, Golden, Colo.

[21] Appl. No.: 109,461

[22] Filed: Oct. 16, 1987

[51] Int. Cl.⁴ .............................................. B65B 41/18
[52] U.S. Cl. ........................................ 156/359; 53/51; 156/64; 156/164; 156/361; 156/495; 226/28
[58] Field of Search ................. 156/361, 358, 359, 64, 156/495, 164; 226/2, 27, 28, 30, 15–16; 53/51

[56] References Cited

U.S. PATENT DOCUMENTS

| | | | |
|---|---|---|---|
| 2,546,059 | 3/1951 | Cloud | 53/51 X |
| 3,427,778 | 2/1969 | McClusky | 53/51 X |
| 3,908,331 | 9/1975 | Donnet | 53/51 X |
| 4,496,417 | 1/1985 | Haake et al. | 226/27 X |
| 4,704,171 | 11/1987 | Thompson et al. | 53/51 X |

*Primary Examiner*—David Simmons
*Attorney, Agent, or Firm*—Klaas & Law

[57] ABSTRACT

A web width control apparatus for controlling the ratio between web width change and web thickness change during a web length varying operation in a web transport system of the type including a moving web of relatively extensible maerial having a series of repeat length portions therealong which are designed to be presented at a web processing station at a preselected constant design length value and in which each said repeat length portion is subject to stretching or shrinking in length depending upon the tension provided in the region of the web in which said repeat length portion is positioned; and further including a first set of nip rolls operable at a selected surface velocity and a second set of nip rolls operable at a selectively variable surface velocity with respect to the surface velocity of said first set of rolls for causing relative length change in a web portion positioned therebetween for adjustably maintaining the respect length portions of the web at said predetermined design length value at the time of presentation of said repeat length portions at said web processing station comprising: web temperature control device for controlling the temperature of a control portion of the web positioned between said first and second sets of nip rolls during web length varying operations whereby a substantially constant, preselected web width is maintained at said web processing station.

11 Claims, 3 Drawing Sheets

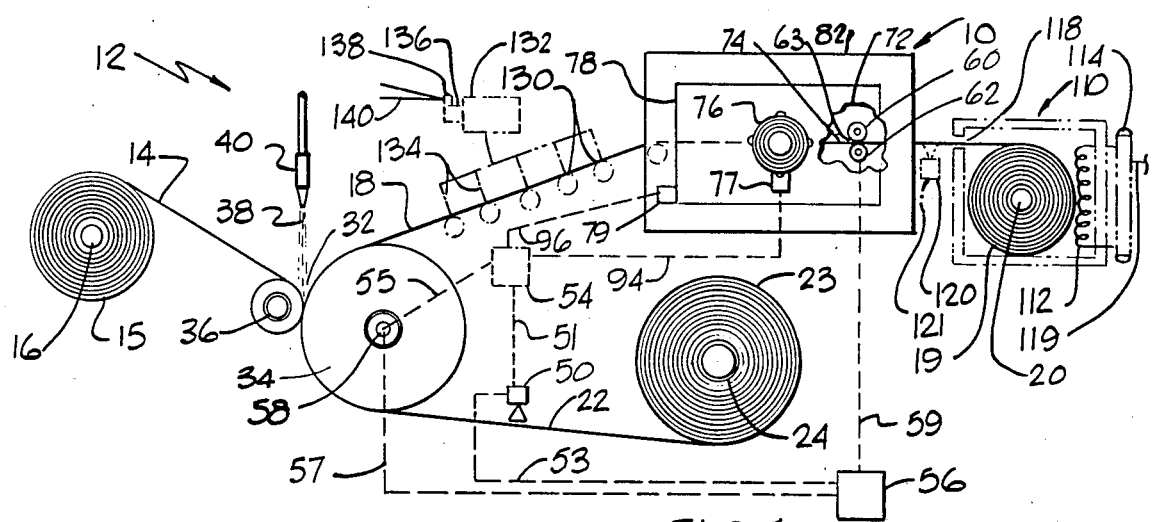
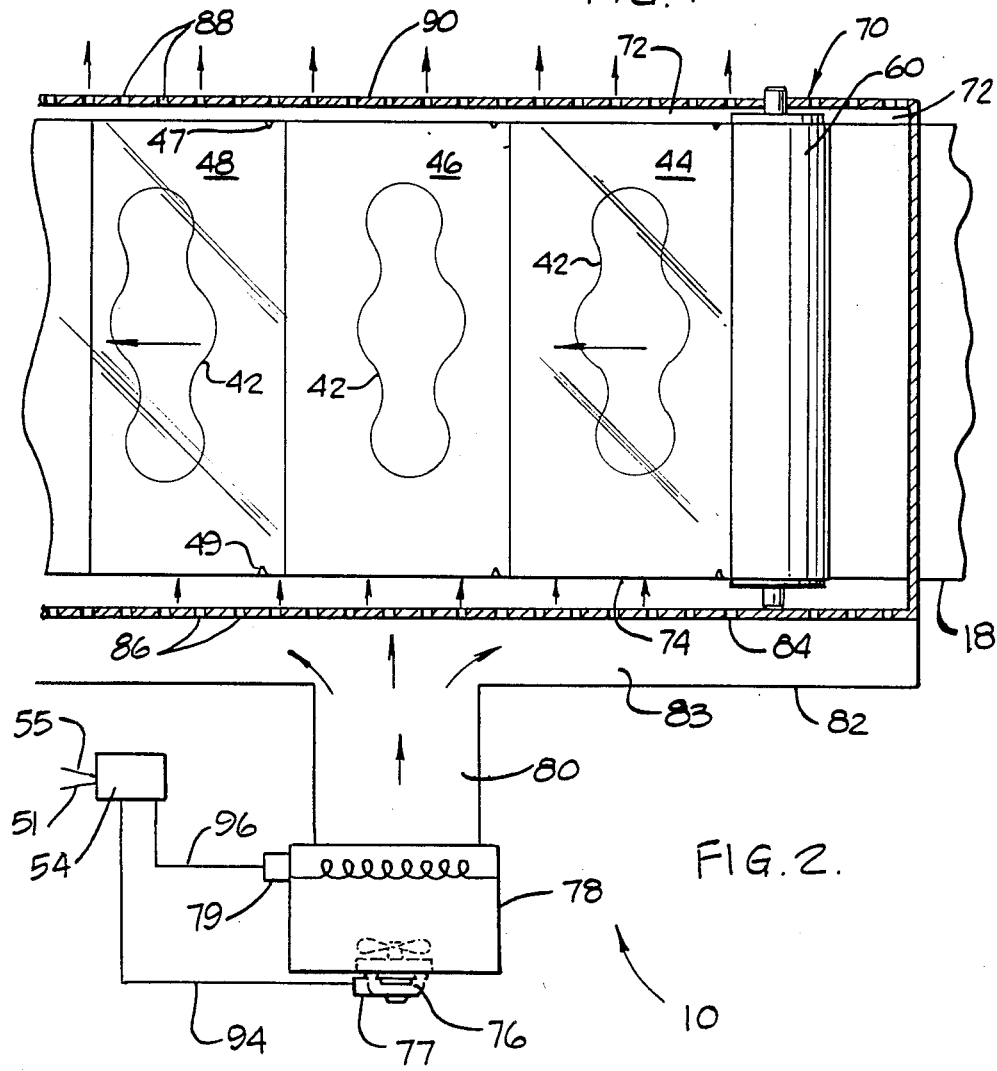
FIG. 1
FIG. 2.

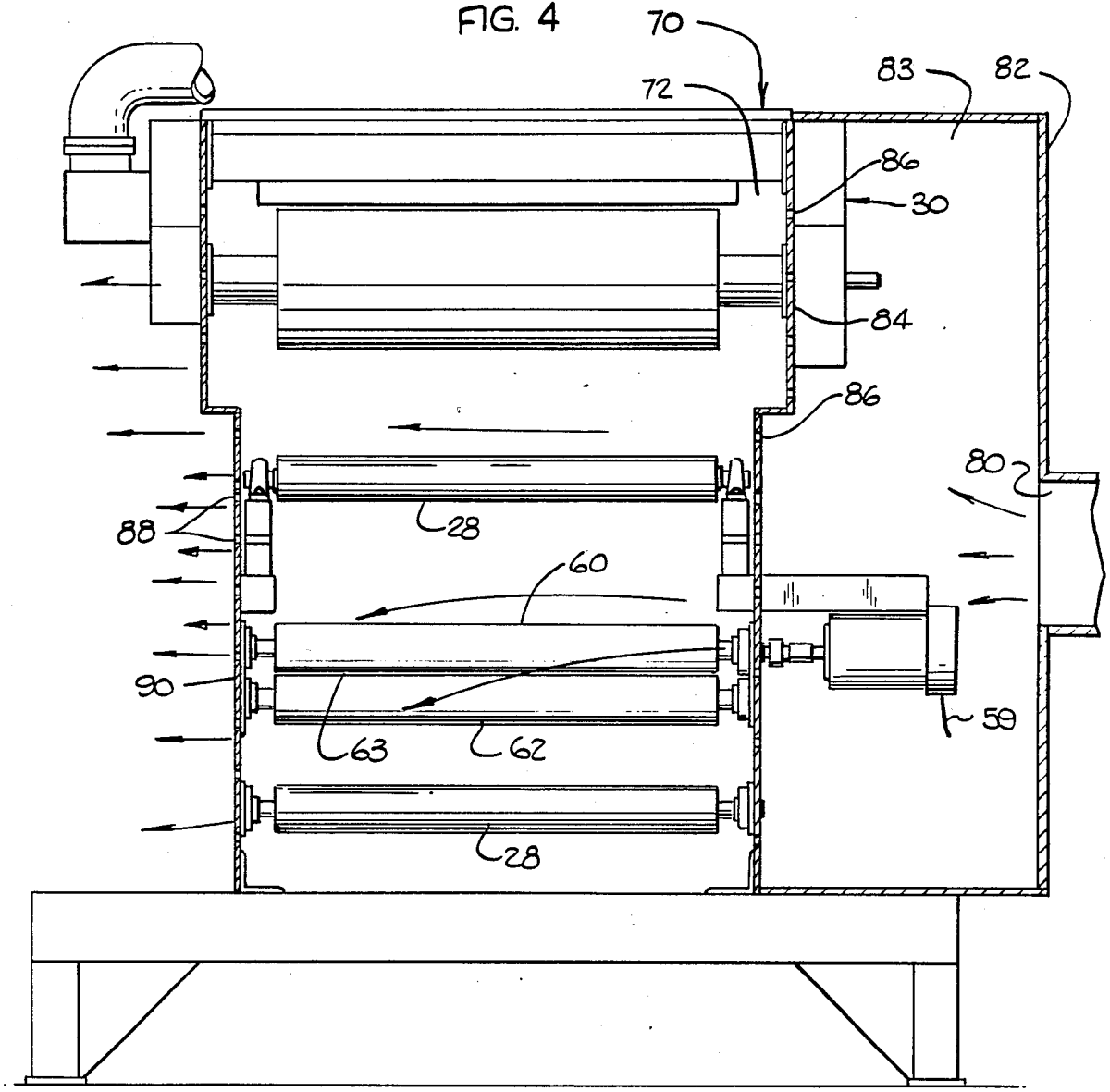

LAMINATING METHOD AND APPARATUS WITH EXTENSIBLE WEB WIDTH CONTROL

BACKGROUND OF THE INVENTION

The present invention relates generally to the production of laminated paper products and, more particularly, to an apparatus for laminating a continuous web of plastic film material to a continuous web of paper backing material which includes a system for controlling the relative width change of the plastic film web during a plastic film web length adjusting operation performed immediately prior to lamination of the plastic film web to the paper web.

Lamination of a plastic film material to a paper material has been found to be particularly advantageous where paper products having high strength and abrasion resistant qualities are required. Such laminated composites are particularly desirable in the packaging industry, where artwork may be printed on the interior side of the plastic film to produce a high quality display package. The construction and use of such laminated composites are described in Peer, U.S. Pat. Nos. 4,254,173; Haake et al, 4,496,417; Jensen et al., 4,572,752; Jensen, 4,610,739; and U.S. patent application Ser. No. 835,234 of Thompson et al., filed Mar. 3, 1986, which are hereby incorporated by reference for all that is disclosed therein.

In producing a laminated composite of the type described in Peer, both the plastic film material and the paper material may be provided in continuous sheets from spools. The paper and the plastic film generally pass over a number of roller-type devices where each of the materials are independently stretched out under tension and treated as necessary depending upon the particular end use for the laminated composite. For example, the plastic material may be irradiated in conventional processes to increase its strength or improve its printability. The plastic may be printed with various graphics and provided with a metalized background over the graphics to enhance the package appearance. The paper web and film web may be oppositely electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth, flat composite. Various heating or cooling processes may also be required to ensure proper adhesion of the surfaces, depending on the type of the film, paper, and adhesive agent which are being used in the laminating process. The end product of the laminating process is a laminated composite which may be fed directly to cutting dies or other machines for further processing. The composite may also be taken up directly on a separate spool for storage and later processing.

Use of a film/paper composite provides many advantages over conventional packaging material but also creates some unique problems. In order to be cost-effective, the plastic film material used is generally quite thin, on the order of 0.25–2.0 mils. Plastic films of such thicknesses tend to stretch or shrink during the lamination process: probably as a result of variations in the strength of the film caused by temperature variations and as a result of the different inertial forces exerted on the film as it is unrolled and processed prior to bonding with the paper, and as a result of other forces and effects. Such stretching and shrinking may cause warping or buckling in the laminated composite as the film returns to a steady state condition after lamination. In many cases, a repeating image is printed on the film for later lamination in registry with predetermined lengths of paper material. In such cases, the printed image length must be held within close tolerances in order to permit proper registry with other processing activities such as automated cutting in a later process step. Stretching or shrinking of the film web effects such length registry.

Apparatus for controlling the length distortion of an extensible plastic film web used in a film/paper laminate are disclosed in the above referenced patents of Haake et al. and Jensen et al., and in the patent application of Thompson et al.

However, in length adjusting operations such as described in the above patents and patent application, an attendant problem of width fluctuation has been experienced. Longitudinal tension variation through relative nip speed control which is used to obtain proper length adjustment in repeat length portions of a film web has been found to produce non-uniform variations in web width. Thus, even though such apparatus may hold the length of repeat length portions of a film web at a substantially constant value at the laminating station, the width of the web at the laminating station has been found to vary. As a result, the laminated composite and the carton blanks, etc., formed from the laminated composite have been somewhat non-uniform in a dimension thereof corresponding to the lateral (width) dimension of the film web. On approach for solving this problem is described in Jensen, U.S. Pat. No. 4,610,739, which is hereby incorporated by reference for all that is disclosed therein. In that patent, a width control method comprising monitoring of the film width; engaging opposite lateral edges of the film web between gripping belt assemblies; and pivoting the belt assemblies outwardly or inwardly in response to a width monitoring signal to provide relative stretching or shrinking in the lateral dimension of the film web is disclosed.

Applicants have discovered that the relative width of a moving plastic film web undergoing length adjustment, such as described in U.S. Pat. Nos. 4,496,417 and 4,572,752, may be controlled by controlling the temperature of the plastic film web during the length adjusting operations. It is applicant's theory that temperature effects the ratio between the change in thickness and the change in width that a film web undergoes during a change in length of the type described in U.S. Pat. Nos. 4,496,417 and 4,572,752.

BRIEF DESCRIPTION OF THE DRAWING

An illustrative and presently preferred embodiment of the invention is shown in the accompanying drawing in which:

FIG. 1 is a perspective view of a laminating apparatus which includes a web temperature control apparatus for controlling web width;

FIG. 2 is a partially cross sectional plan view of a web temperature control apparatus used in association with the laminating apparatus of FIG. 1;

FIG. 4 is a cross sectional front elevation view of the web temperature control apparatus of FIG. 3 with the web removed to more clearly show the position of various operating components.

SUMMARY OF THE INVENTION

Figure 3:
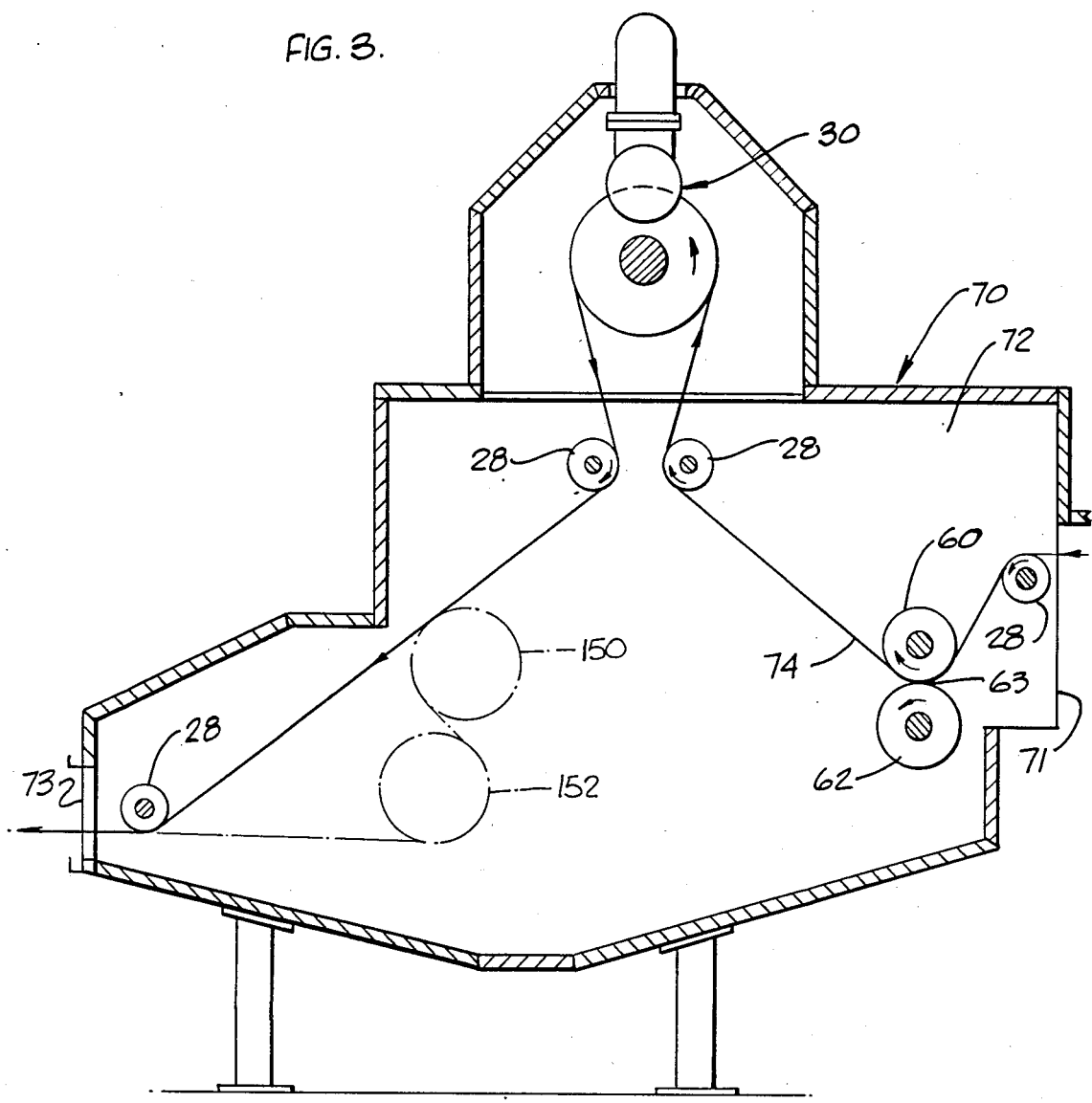
FIG. 3 is a cross sectional side elevation view of one specific embodiment of a web temperature control apparatus showing certain additional structures over that shown in FIGS. 1 and 2, including a corona treater and idler rolls and a web path provided thereby.

The present invention may comprise a web width control apparatus for controlling the ratio between web width change and web thickness change during a web length varying operation in a web transport system of the type including a moving web of relatively extensible material having a series of repeat length portions therealong which are designed to be presented at a web processing station at a preselected constant design length value and in which each said repeat length portion is subject to stretching or shrinking in length depending upon the tension provided in the region of the web in which said repeat length portion is positioned; and further including a first set of nip rolls operable at a selected surface velocity and a second set of nip rolls operable at a selectably variable surface velocity with respect to the surface velocity of said first set of rolls for causing relative length change in a web portion positioned therebetween for adjustably maintaining the repeat length portions of the web at said predetermined design length value at the time of presentation of said repeat length portions at said web processing station comprising: web temperature control means for controlling the temperature of a control portion of the web positioned between said first and second sets of nip rolls during web length varying operations whereby a substantially constant, preselected web width is maintained at said web processing station.

The present invention may also comprise an apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; and film material normally being extensibly deformable such that the longitudinal distance between any two reference points on the film web may vary significantly during lamination; the apparatus comprising: paper supply means for providing a continuous supply of paper to be laminated; film supply means for providing a continuous supply of film to be laminated; first nip means positioned downstream said film supply means for advancing a first portion of film web passing therethrough at a first film web speed; laminating means positioned downstream said first nip means for bondingly compressing said film web to said paper web to form a laminated composite continuous with said film web and for advancing a second portion of film web passing therethrough at a second film web speed; first nip means speed varying means for varying said first film web speed with respect to said second film web speed for selectively stretching or relaxing the portion of said film web positioned between said first nip means and said second nip means; film length monitoring means for measuring the length of predetermined portions of said film web and for providing a monitor signal to a first data processing means; first data processing means for comparing said monitor signal to a predetermined design length value and providing command signals responsive thereto to said nip means speed varying means for adjusting said first film web speed relative said second film web speed for imparting a predetermined amount of stretch or relaxation to said film web whereby predetermined portions of said film web are continuously extensibly adjusted to a predetermined length corresponding to said predetermined design length value; and web temperature control means for controlling the temperature of a control portion of said film web positioned between said first nip means and said laminating nip during film web length varying operations for maintaining a substantially constant, preselected web width at said laminating nip.

The present invention may also comprise a method of controlling the ratio between width changes and thickness change in an extensible moving web during a web length varying operation comprising: controlling the temperature of the web during the length varying operation.

DETAILED DECRIPTION OF THE INVENTION

One embodiment of the web width control apparatus 10 of the present invention is illustrated schematically in FIGS. 1 and 2, as a component of a laminating apparatus 12. The laminating apparatus may comprise a continuous paper web 14 which is supplied from a paper roll 15 mounted on an unwind spool assembly 16 and a relatively extensible, continuous plastic film web 18 which is supplied from a film roll 19 mounted on an unwind spool assembly 20. The paper web and film web are laminated together to form a continuous web of laminated composite 22 which is collected on a composite roll 23 mounted on a collection spool assembly 24. The paper web and film web may each be processed either prior to mounting of the paper roll and film roll on the laminating device or during web travel on the laminating device upstream of a laminating nip 32. For example, in one specific embodiment of the invention illustrated in FIGS. 3 and 4, the film web passes over a corona treater assembly 30 which places an electrostatic charge on the film web which facilitates lamination. Laminating nip 32 may be provided by a driven cooling roll 34 and a backing roll 36. Immediately prior to entering the laminating nip, one or both of the paper web 14 and film web 18 may be coated with an adhesive material such as hot-melt 38 which may be provided by an extruder assembly 40. The film web 18 may be provided with repeating sets of graphics 42 at relatively constant repeat length portions 44, 46, 48, etc., thereof, FIG. 2. Register indicia 47, 49, which may be in the form of triangular marks such as described in detail in U.S. Pat. No. 4,610,739 of Jensen, may be provided on each repeat length portion of the web to enable the width and length of each repeat length portion to be measured by scanning with a web scanning device 50 and by processing of the scan signals by associated data processing means, such as microcomputer 54 which calculates width measurements, and microcomputer 56 which calculates length measurements, from web scanning signals 51, 53, respectively, and laminating nip surface speed signals 55, 57, respectively, such as provided by an encoder device 58 operably mounted on the cooling roll 34. A control nip roll speed control signal 59 is generated by microcomputer 56 based upon the comparison of the determined actual repeat length distances of repeat length portions, e.g. 44, 46, 48, scanned by scanning device 50 to a predetermined design repeat length value. The control signal 59 causes a pair of driven control nip rolls 60, 62 to operate at a surface speed which may be varied with respect to the surface speed of laminating nip 32, which provides a relative stretching or shrinking in the film web portion extending between control nip 63 provided by rolls 60, 62 and the laminating nip 32. Such a laminating device having apparatus for maintaining the repeat length distance on repeat length portions of a film web at a relatively constant value is known in the art and is described in detail in the patents of Haake, et al., Jensen et al., Jensen, and Thompson, et al., which are incorporated by reference above.

In one embodiment, which is presently the best mode contemplated, the web width control apparatus 10 of the present invention comprises a housing 70 which encompasses a portion of the web length extending between the film unwind spool 20 and the laminating nip 32. The housing 70 is provided with a film entrance opening such as 71 and a film exit opening such as 73, shown in the specific embodiment of FIG. 3. The housing 70 defines a chamber 72 having a fluid such as air therein which contacts the surface of the film portion 74 which is enclosed by the housing 70. The web width control apparatus 10 also includes a chamber fluid heat exchange means 78 such as conventional heating and/or cooling coils for controlling the temperature of the fluid in chamber 72. The heat exchange means may be controlled such as by a conventional control unit 79. An air duct 80 is provided for directing a fluid flow from a fluid flow providing means such as fan 76 which may cause an air flow to pass through heat exchange means 78. The duct 80 directs the temperature-controlled air flow into a manifold chamber 83 provided by manifold 82. The manifold chamber 83 may be substantially coextensive with one lateral sidewall 84 of chamber housing 70. Sidewall 84 is provided with a plurality of air holes 86 in the portion thereof interfacing with manifold chamber 83. Air entering the manifold chamber 83 from duct 80 is distributed throughout the manifold chamber 83 and enters the conditioning chamber 72 through air holes 86. A plurality of air holes 88 may also be provided in the opposite chamber housing lateral sidewall 90. Holes 88 allow air to flow out of fluid chamber 70. The temperature of the film web portion 74 passing through the fluid chamber 70 may be controlled by controlling the temperature of the air passing through the chamber, as by control of the temperature of heating and cooling coil in heat exchange means 78. The temperature of web portion 74 may also be controlled by controlling the rate of air flow through the chamber, as by control of the speed of fan 76. Such temperature control may be provided by control signals from computer 54 which are generated, as explained above, based upon a comparison of the desired film width and the actually measured film width at a station corresponding to the position of scanning device 50. If the measured film width at the scanning device 50 is too great, the relative temperature of film web portion 74 is decreased. If the measured film width is too small, the temperature of web portion 74 is increased. Such temperature control may be provided by sending a control signal 94 to fan speed control unit 77 or may be accomplished by sending an appropriate control signal 96 to heat exchange control unit 79, or may be provided by sending appropriate signals to both such control units 77, 79.

In one specific embodiment of the invention as best illustrated in FIGS. 3 and 4, the conditioning chamber 72 may enclose nip rolls 60, 62 and a corona treater assembly 30 and associated idler rolls 28. In FIG. 4, the film web is not shown for illustrative purposes so as to more clearly show the position of the various rolls. The length of the web portion 74 enclosed by the chamber housing 70 may be approximately 20 feet when used in association with a film web having a maximum laminating web speed of approximately 1,600 feet per minute, and being constructed of a material similar or identical in properties to that of 1.0 inch thick polyurethane. The width of the conditioning chamber is preferably slightly larger, e.g. 10% larger, than the width of the associated film web which is typically, e.g., 55 inches.

In another embodiment of the invention, as illustrated in phantom lines in FIG. 1, an insulating housing 110 is provided for enclosing film unwind spool 19. A temperature control means such as heating and/or cooling coil 112 having a control box 114 is provided for controlling the temperature of fluid, which in one preferred embodiment comprises air within housing 110. The housing 110 may enclose the film roll 19 when it is positioned on the unwind spool assembly of the laminating apparatus, as illustrated in FIG. 1. In this embodiment, the housing 110 is provided with a web exit opening 118. A hinged door, etc. (not shown) may be provided for enabling film roll replacement. In another embodiment, an apparatus, which may be identical to the insulating housing 110 shown in FIG. 1, is provided for storing film web rolls prior to their mounting on spool 20 in order to bring the film roll to a temperature which is within an optimum range for providing proper web width responses to length change. For example, a temperature range between 60° F. and 80° F., and most preferably a temperature of about 70° F. In situations in which an entire film web roll is laminated to a paper web in a relatively short period of time, e.g. 2 hours, the rate of heat loss from the film roll 19 may be sufficiently slow to maintain the web 18 temperature near an optimum operating temperature for the entire laminating process. In the embodiment illustrated in FIG. 1 in which the insulated housing encloses a film web mounted on the spool 20 of the laminating apparatus, the temperature of the film web may be maintained at a desired temperature indefinitely. A control signal from computer 54 shown at 119 may also be used to adjust the relative temperature within the housing 110 and thus the temperature of the film web enclosed therein. It will be appreciated that the film temperature control apparatus of 110 responds much more slowly than the temperature control apparatus 10. In another preferred embodiment of the invention, the two temperature control apparatus 10 and 110 are used together, with apparatus 110 providing a coarse temperature control of the web as by maintaining the web at a relatively constant temperature of, say, 70° F. Web temperature control apparatus 10 is used for fine temperature control of the web responding directly to signals from computer 56.

When the web is used in an environment in which only web cooling is required in order to bring the web into a proper temperature range, a liquid spray 120 may be provided immediately downstream of the film unwind spool 20. The liquid spray 120, as indicated in phantom at 121, may be actuated in response to a control signal from computer 54. The spray, which may be water, is preferably directed to the side of the film web opposite the side which is laminated to the paper web to avoid interfering with the adhesion of the film web to the paper web. Such a water spray cooling apparatus will be relatively more effective at relatively high web speeds and in relatively low humidity environments in which evaporation and associated cooling due to evaporation may take place rapidly.

In another embodiment of the invention, as further illustrated in phantom lines in FIG. 1, a web temperature controlling apparatus comprising a plurality of air bars 130 is provided along a length of the film web 18 positioned between the unwind spool 20 and laminating nip 32. The air bars 130 are generally cylindrical in shape and have a plurality of small diameter holes along surface portions thereof positioned directly opposite the film web 18. Air provided by an air supply 132 and supply lines 134 passes through the small holes in the air bars to provide an air cushion over which the film web 18 moves. In a preferred embodiment, an air supply cooling unit 136 is operably associated with the air supply 132. A cooling unit control box 138, which may be actuated by a control signal indicated at 140 which may be provided from computer 54, selectively cools the air which is discharged from the air bars. Air bars are known in the art and may be of the type available from Newmet Krebsoege, located at Route 6 and Burr Road, Terryville, Conn., 06786. In one preferred embodiment of the invention, air bars 130 are used in association with a water spray 120, with the cooling provided by water spray evaporation being used for coarse mode temperature control, and with air temperature control being used for fine temperature control. It will, of course, be appreciated that the air flow provided by the air bars will accelerate the evaporation of water from the surface of the web.

In yet another embodiment of the invention as illustrated in phantom in FIG. 3, the web is placed in physical contact with heating/cooling roll means such as conventional liquid heated/cooled rolls 150, 152 which are driven at a rate such that the surface speed of the rolls are equal to the speed of the web. The web may be wrapped about the rolls in a conventional "S-wrap" configuration. The temperature of the rolls 150, 152 may be varied by varying the temperature and/or flow rate of the liquid which passes therethrough.

Any other combination of the above-described web temperature control apparatuses may also be employed to achieve temperature control of the web.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; and film material normally being extensibly deformable such that the longitudinal distance between any two reference points on the film web may vary significantly during lamination; the apparatus comprising:

paper supply means for providing a continuous supply of paper to be laminated;
film supply means for providing a continuous supply of film to be laminated;
first nip means positioned downstream said film supply means for advancing a first portion of film web passing therethrough at a first film web speed;
laminating means positioned downstream said first nip means for bondingly compressing said film web to said paper web to form a laminated composite continuous with said film web and for advancing a second portion of film web passing therethrough at a second film web speed;
first nip means speed varying means for varying said first film web speed with respect to said second film web speed for selectively stretching or relaxing the portion of said film web positioned between said first nip means and said second nip means;
film length monitoring means for measuring the length of predetermined portions of said film web and for providing a monitor signal to a first data processing means;
first data processing means for comparing said monitor signal to a predetermined design length value and providing command signals responsive thereto to said nip means speed varying means for adjusting said first film web speed relative said second film web speed for imparting a predetermined amount of stretch or relaxation to said film web whereby predetermined portions of said film web are continuously extensibly adjusted to a predetermined length corresponding to said predetermined design length value; and
web temperature control means for controlling the temperature of a control portion of said film web positioned between said first nip means and said laminating nip during film web length varying operations for maintaining a substantially constant, preselected web width at said laminating nip.

2. The invention of claim 1 wherein said web temperature control means comprises:
a fluid chamber enclosing at least a portion of said film web which is positioned upstream of said laminating means; and
said fluid chamber comprising a fluid in surface contacting, heat exchanging relationship with said film web portion positioned in said chamber.

3. The invention of claim 2 wherein said fluid in said chamber comprises air.

4. The invention of claim 2 wherein said temperature control means further comprises fluid temperature control means for controlling the temperature of said fluid in said fluid chamber for controlling the rate of heat exchange between said fluid and said web portion in said fluid chamber.

5. The invention of claim 2 further comprising:
fluid flow means for providing a flow of said fluid through said fluid chamber; and
flow control means for controlling the flow rate of said fluid for controlling the rate of heat exchange between said fluid and said film web portion in said fluid chamber.

6. The invention of claim 1 wherein said film web temperature control means comprises a plurality of air bars positioned upstream of said web processing station and adapted to support a portion of said web passing thereover on an air flow provided through a plurality of surface openings in said air bars.

7. The invention of claim 6 further comprising air temperature control means for controlling the temperature of said air flow provided by said air bars.

8. The invention of claim 1 wherein said film web temperature control means comprises liquid applicator means for applying a liquid to a surface portion of the film web for cooling the web by evaporation of liquid therefrom.

9. The invention of claim 6 wherein said web temperature control means comprises liquid applicator means for applying a liquid to a surface portion of the web for cooling the web by evaporation of liquid therefrom.

10. The invention of claim 2 wherein said fluid chamber encloses said film supply means.

11. The invention of any of claims 1-10 further comprising:

film web width monitoring means positioned proximate said laminating means for measuring the width of said film web and providing a web width signal indicative thereof; and signal processing means for receiving said width signal and sending a control signal to said web temperature control means responsive thereto for increasing the temperature of said control portion of said film web when said sensed width value is less than a predetermined value and for decreasing the temperature of said control portion of said film web when said sensed width value is greater than a predetermined value.

* * * * *